United States Patent
Lindblom et al.

(10) Patent No.: US 7,824,096 B2
(45) Date of Patent: Nov. 2, 2010

(54) AUXILIARY WATER TANK AND PUMP ASSEMBLY FOR A CONCRETE MIXING VEHICLE

(75) Inventors: Thomas G. Lindblom, Claremont, MN (US); Ted M. Daly, Kasson, MN (US); Thomas P. Quigley, Rochester, MN (US)

(73) Assignee: McNeilus Truck and Manufacturing, Inc., Dodge Center, MN (US)

( * ) Notice: Subject to any disclaimer, the term of this patent is extended or adjusted under 35 U.S.C. 154(b) by 954 days.

(21) Appl. No.: 11/355,049

(22) Filed: Feb. 15, 2006

(65) Prior Publication Data

US 2007/0189108 A1   Aug. 16, 2007

(51) Int. Cl.
*B28C 5/42* (2006.01)
(52) U.S. Cl. .................. 366/54; 366/175.3; 137/565.12
(58) Field of Classification Search ............. 366/53–62, 366/138, 175.3; 137/565.36, 625.4, 565.12, 137/565.17, 590; 222/382, 383.1
See application file for complete search history.

(56) References Cited

U.S. PATENT DOCUMENTS

| | | | |
|---|---|---|---|
| 3,310,293 A | | 3/1967 | Zimmerman |
| 3,332,435 A | * | 7/1967 | Anderson et al. ............. 417/28 |
| 3,773,303 A | * | 11/1973 | Griffith .......................... 366/4 |
| 4,159,877 A | * | 7/1979 | Jacobson et al. .............. 366/22 |
| 4,194,925 A | * | 3/1980 | Holbrook et al. .............. 134/24 |
| 4,758,097 A | * | 7/1988 | Iles, Sr. ...................... 366/149 |
| 4,789,244 A | * | 12/1988 | Dunton et al. ................. 366/12 |
| 4,900,154 A | * | 2/1990 | Waitzinger et al. ............ 366/56 |
| 5,065,781 A | * | 11/1991 | Cox ........................ 137/15.04 |
| 5,133,484 A | * | 7/1992 | Globert et al. .............. 222/376 |
| 5,217,140 A | | 6/1993 | Lindahl |
| 5,570,953 A | * | 11/1996 | DeWall ........................ 366/10 |
| 5,957,670 A | | 9/1999 | Duncan et al. |
| 6,155,277 A | * | 12/2000 | Barry ....................... 134/104.4 |
| 6,354,439 B1 | * | 3/2002 | Arbore ........................ 209/421 |
| 6,782,925 B2 | * | 8/2004 | Raposo et al. ................. 141/5 |
| 6,866,047 B1 | * | 3/2005 | Marvin ....................... 134/22.1 |
| 6,871,658 B2 | * | 3/2005 | Gjestvang ............... 134/167 R |
| 7,581,557 B2 | * | 9/2009 | Lindblom et al. ........... 366/138 |
| 7,730,903 B2 | * | 6/2010 | Lindblom et al. ........... 366/138 |
| 2007/0086270 A1 | * | 4/2007 | Harris et al. .................. 366/59 |

(Continued)

FOREIGN PATENT DOCUMENTS

GB        2073371 A   *  10/1981

(Continued)

OTHER PUBLICATIONS

International Search Report and Written Opinion, dated Oct. 4, 2007.

*Primary Examiner*—Charles E Cooley
(74) *Attorney, Agent, or Firm*—Nikolai & Mersereau, P.A.; C. G. Mersereau

(57) ABSTRACT

A self-purging auxiliary fluid supply system for supplying washout or makeup water or other fluids under pressure to a truck-mounted concrete mixing/dispensing drum is disclosed. The system includes a truck-mounted fluid reservoir for containing a quantity of fluid connected to supply fluid to an air-operated diaphragm pump connected to supply auxiliary fluid from the fluid reservoir under pressure to a discharge assembly. The pump further provides an integral purge system for displacing fluid in the fluid supply system after use.

6 Claims, 7 Drawing Sheets

U.S. PATENT DOCUMENTS

| | | | |
|---|---|---|---|
| 2007/0189108 A1* | 8/2007 | Lindblom et al. | 366/30 |
| 2008/0173372 A1* | 7/2008 | Lindblom et al. | 141/94 |
| 2008/0205188 A1* | 8/2008 | Lindblom et al. | 366/44 |
| 2009/0044832 A1* | 2/2009 | Leonardich et al. | 134/10 |
| 2009/0154287 A1* | 6/2009 | Lindblom et al. | 366/40 |
| 2009/0283530 A1* | 11/2009 | Lindblom et al. | 220/564 |

FOREIGN PATENT DOCUMENTS

| | | | |
|---|---|---|---|
| GB | 2377391 A * | 1/2003 | |

* cited by examiner

AUXILIARY WATER TANK AND PUMP ASSEMBLY FOR A CONCRETE MIXING VEHICLE

BACKGROUND OF THE INVENTION

I. Field of the Invention

The present invention relates generally to vehicle-mounted concrete mixing and dispensing systems and, more particularly, to on-board auxiliary fluid supply systems employed to supply water for washout or adding water to a concrete mix. Specifically, the present invention relates to a pump-operated on-board auxiliary fluid supply system that eliminates the need for a pressurized tank and is self purging of residual fluid.

II. Related Art

Transit concrete mixing trucks, sometimes referred to as ready-mix trucks, have long been in use. They are equipped with large chassis-mounted rotatable mixing drums for mixing and dispensing a quantity of concrete. The drums typically are mounted on an incline and have an opening in the upper end for receiving ingredients to be mixed and discharging mixed concrete products. Loading is accomplished through a charge hopper which extends a distance into the opening of the drum. The drum is further provided with internal helical flights or fins extending around its internal surface which acts to mix the concrete when the drum is caused to rotate in one direction and cause the concrete to be discharged out of the opening when the rotation of the drum is reversed. The upper portion of the drum includes a ring and roller system for drum support and rotation that is carried by a heavy pedestal support assembly.

After mixing and discharge, such concrete mixing drums retain an amount of residual concrete on the mixing fins and inner drum surface and discharge chutes which needs to be periodically washed out to prevent it from curing and hardening inside the drum and on external chutes. Therefore, it has become part of the operating routine to wash the interior of the drum and the discharge chutes one or more times per day. In addition, it may be necessary to add additional makeup water to a mix in the drum prior to discharge.

In conjunction with the use of makeup or washout water on transit concrete mixing trucks, it has further become a common practice to provide a water supply on the vehicle. The supply has included a water tank that has been typically pressurized to 50 psi or higher by a supply of air from a compressor carried on the truck. This, in turn, supplies water under pressure for washout or other uses through hoses and a valving system in a well-known manner.

Such a prior system is illustrated in FIGS. 1a and 1b in which a concrete mixer truck, generally at 10, having a mixing drum 12 and discharge chute 14 is provided with a pressurizable auxiliary water tank 16 mounted on the vehicle. As seen in FIG. 1b, the auxiliary water tank 16 includes an air inlet valve 20 that controls the flow of air under pressure from a pressure source (not shown) through an air supply line (also not shown). An air pressure regulator with gauge 22 is provided, together with a pressure relief or pop-off valve at 24, which prevents over-pressurization of the system. A discharge outlet pipe or hose is provided at 26 suitably valved at 28. The system may be purged by using pressurized air to clear the hose or pipe 26.

More recently, however, government regulations have curtailed the use of such pressurized tanks in many areas and so it would be desirable to eliminate the need for pressurization of the tank without diminishing the washout or easy purge capabilities of the system.

SUMMARY OF THE INVENTION

By means of the present invention, there is provided a self-purging auxiliary fluid supply system for supplying water for washout or adding to batches in a truck-mounted concrete mixing drum. The system includes a truck-mounted fluid reservoir for containing a quantity of water, the reservoir being connected to supply non-pressurized fluid to a pump assembly. The pump assembly includes an air-operated diaphragm pump apparatus for supplying auxiliary fluid from the fluid reservoir under pressure to a discharge assembly which connects to a conventional washout/supply system associated with the operation of the mixing drum. The fluid supply system is provided with valving which enables it to quickly integrally purge itself after use.

Several embodiments are shown with different locations for the mounting of the pump of the invention. The system is designed for ease of manufacture or as a convenient retrofit system on existing transit concrete mixing trucks. The pump and piping system eliminate the need for pressurizing the reservoir tank and facilitate the draining or purging of associated water lines to prevent freezing in cold weather. A typical diaphragm pump of the invention uses air at about 100 psig to operate the pump and can supply up to 25 gpm of water at a pressure of about 10 psig for water injection or about 8 gpm at about 75 psig for washout.

BRIEF DESCRIPTION OF THE DRAWINGS

In the drawings, wherein like numerals depict like parts throughout the same:

FIG. 1b is an enlarged side elevational view of a prior art auxiliary water tank from the system of FIG. 1a;

FIG. 3b is an enlarged frontal view of the diaphragm pump of FIG. 3a;

DETAILED DESCRIPTION

Certain embodiments of the present invention will be described with reference to drawing figures. They represent examples of an auxiliary water supply system for a transit concrete mixing truck which provides high pressure water for washout or additional water to be added to the drum. The embodiments described are meant as examples and are not intended to limit the inventive concepts.

It is an important aspect of the present invention that the need for an expensive pressurized water supply tank is eliminated. In addition, the invention further provides a rapid self-purging feature to purge the system of water after use.

Figure 1A:
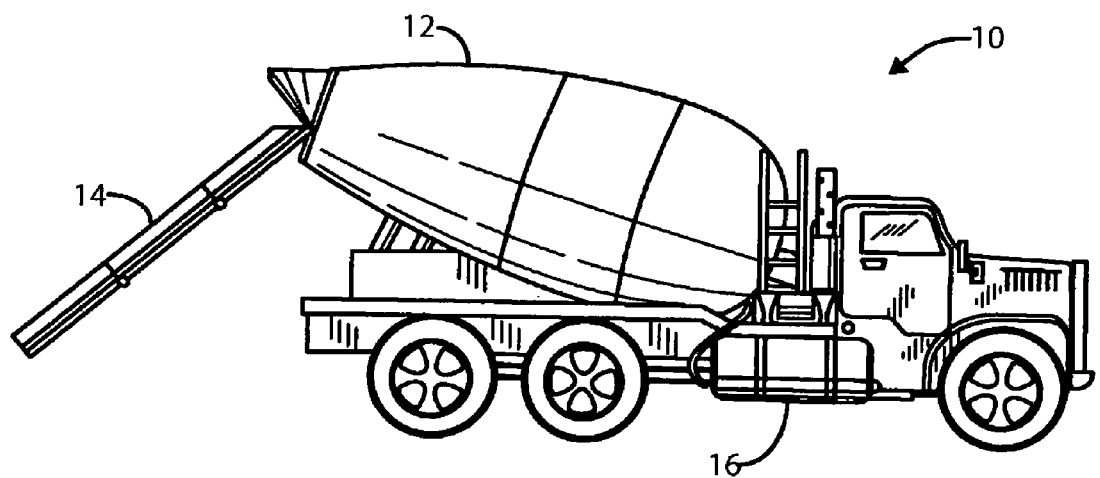
FIG. 1a is a side elevational view of a transit concrete mixing truck carrying an auxiliary water system in accordance with the prior art.
Figure 1B:
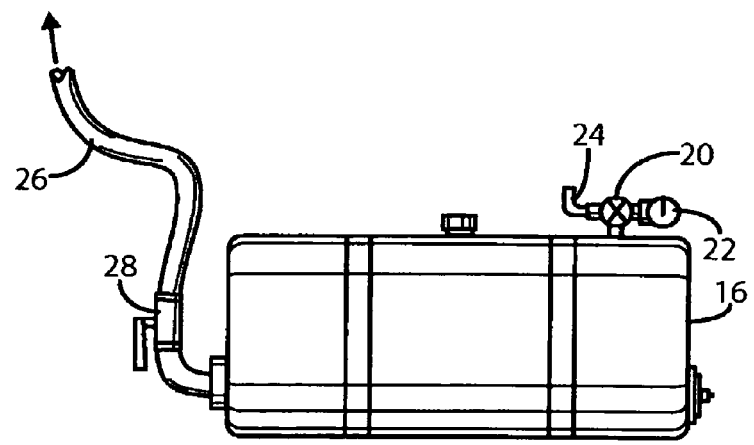
Figure 2:
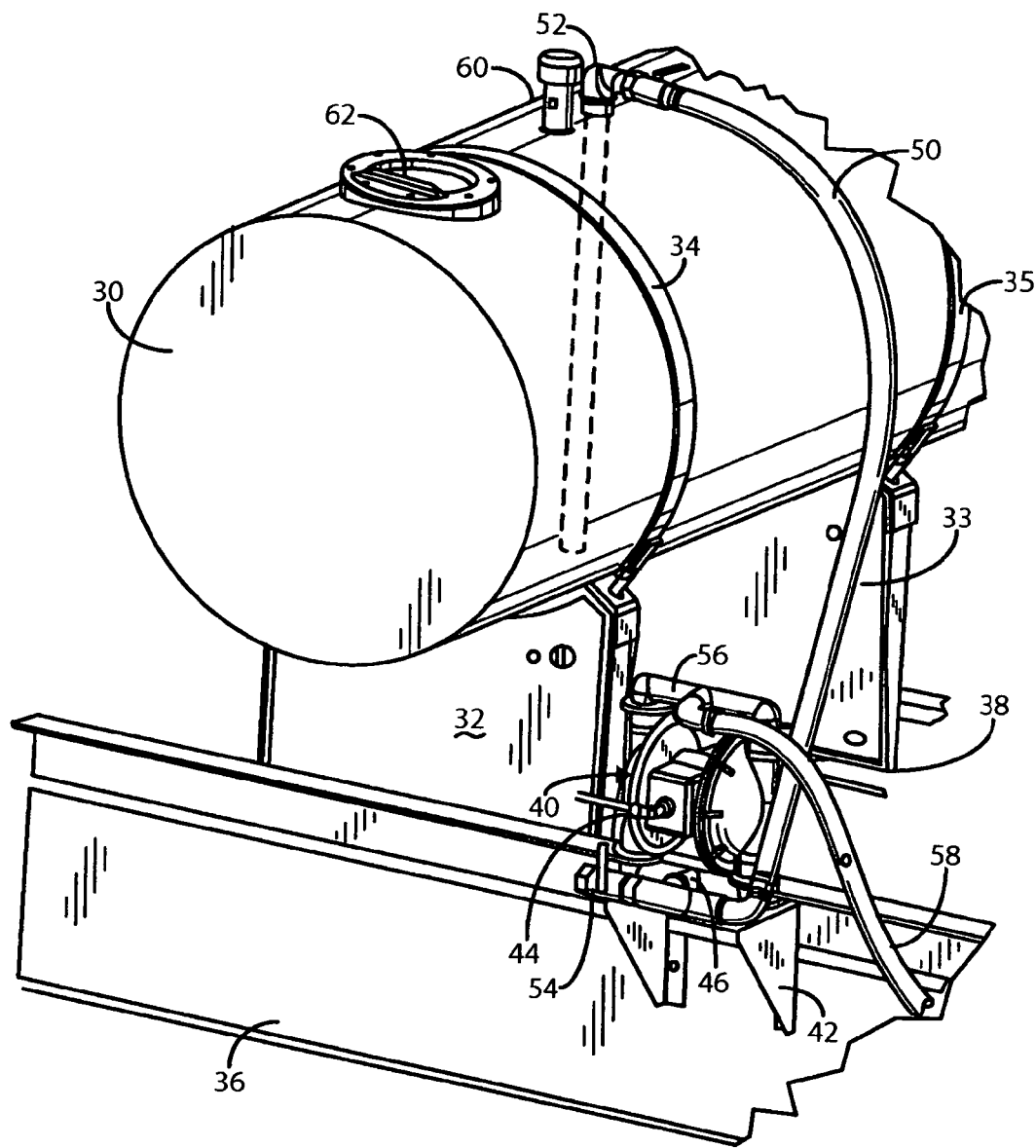
FIG. 2 is an enlarged partial perspective view of an embodiment of an auxiliary water system in accordance with the present invention which utilizes a side pump mounting.

FIG. 2 depicts an enlarged partial perspective view of an embodiment of the invention which includes a side or frame-mounted pump. The system includes an auxiliary water supply tank 30 which may be fabricated from metal or non-metal materials and is shown carried by support pedestals or saddles 32, 33 fixed thereto by heavy straps 34, 35. Saddles 32, 33, in turn, are fixed to truck frame members 36, 38, respectively. An air-operated diaphragm pump 40 is mounted on a bracket 42 fixed to the truck frame member 36. An air supply inlet connection is shown at 44, which connects to an air pressure supply tank or accumulator which is pressurized by a conventional source of high pressure air such as a compressor (not shown) used to operate diaphragm pump 40. The pump 40 has a suction inlet at 46 including a tee, one side of which is connected to a water feed line 50 which, in turn, is connected to the tank 30 at 52.

The tank discharge is preferably a top discharge, bottom draw system using a conventional bottom draw standpipe tube (not shown) that is connected to outlet 52 at the top and extends to the bottom of the tank. This greatly facilitates hose system drainage after use. However, a bottom discharge arrangement can also be used. The tee also leads to a manually operated ball valve 54 used to drain and purge the system. The pump discharge outlet manifold shown at 56 is connected to a pump discharge hose 58 usable for washout or adding water to the drum. The water tank 30 is further provided with a breather vent 60 and fill opening 62. The pump discharge hose 58 is connected to conventional suitable control valves (not shown) in a well known manner.

Figure 3A:
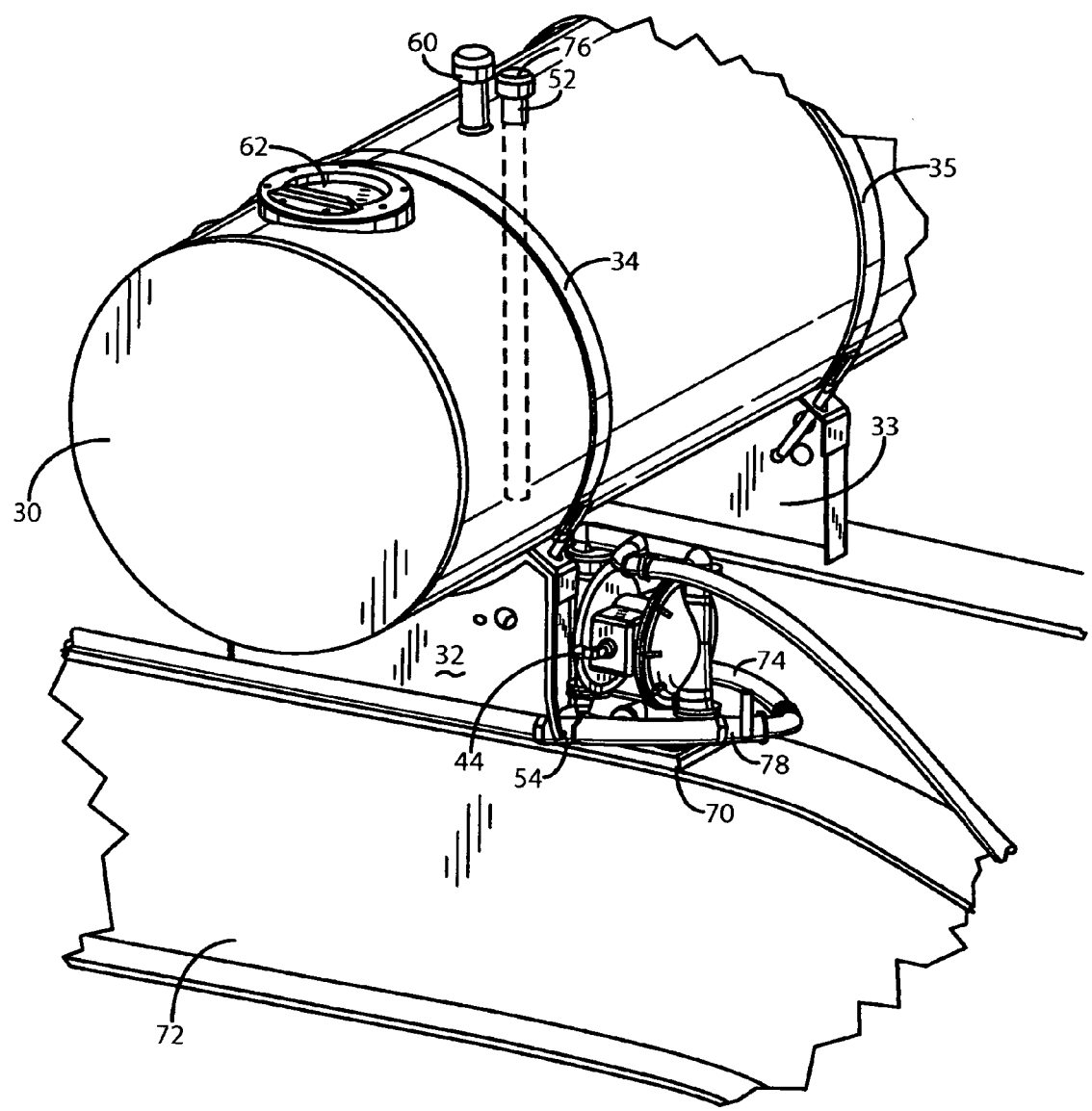
FIG. 3a is a view similar to FIG. 2 illustrating an alternate embodiment of the auxiliary water system of the present invention.
Figure 3B:
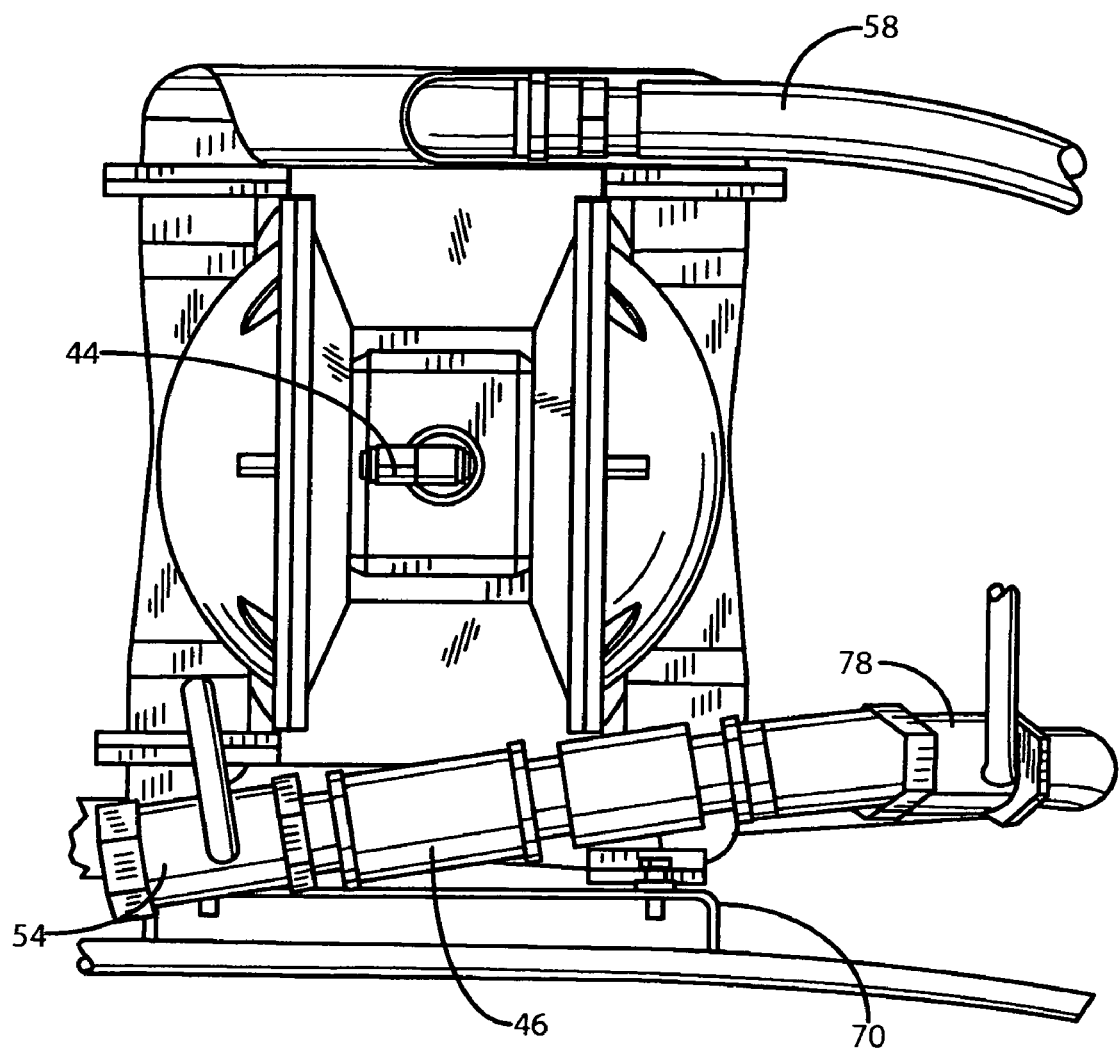

FIGS. 3a and 3b depict an alternative trailer-mounted embodiment which uses a mounting bracket 70 mounted flush with trailer frame member 72. In this embodiment, the water feed line 74 is shown as being connected to a tank discharge outlet on the bottom of the tank 30 and the upper outlet 52 is suitably capped at 76. Of course, a top discharge, bottom-draw connection could also be used. A ball valve is provided in the intake line at 78. As best seen in FIG. 3b, the input/drain line between valves 78 and 54 is inclined slightly downward to valve 54. This is to assure easy drainage when valve 54 is opened after the system is used.

Figure 4:
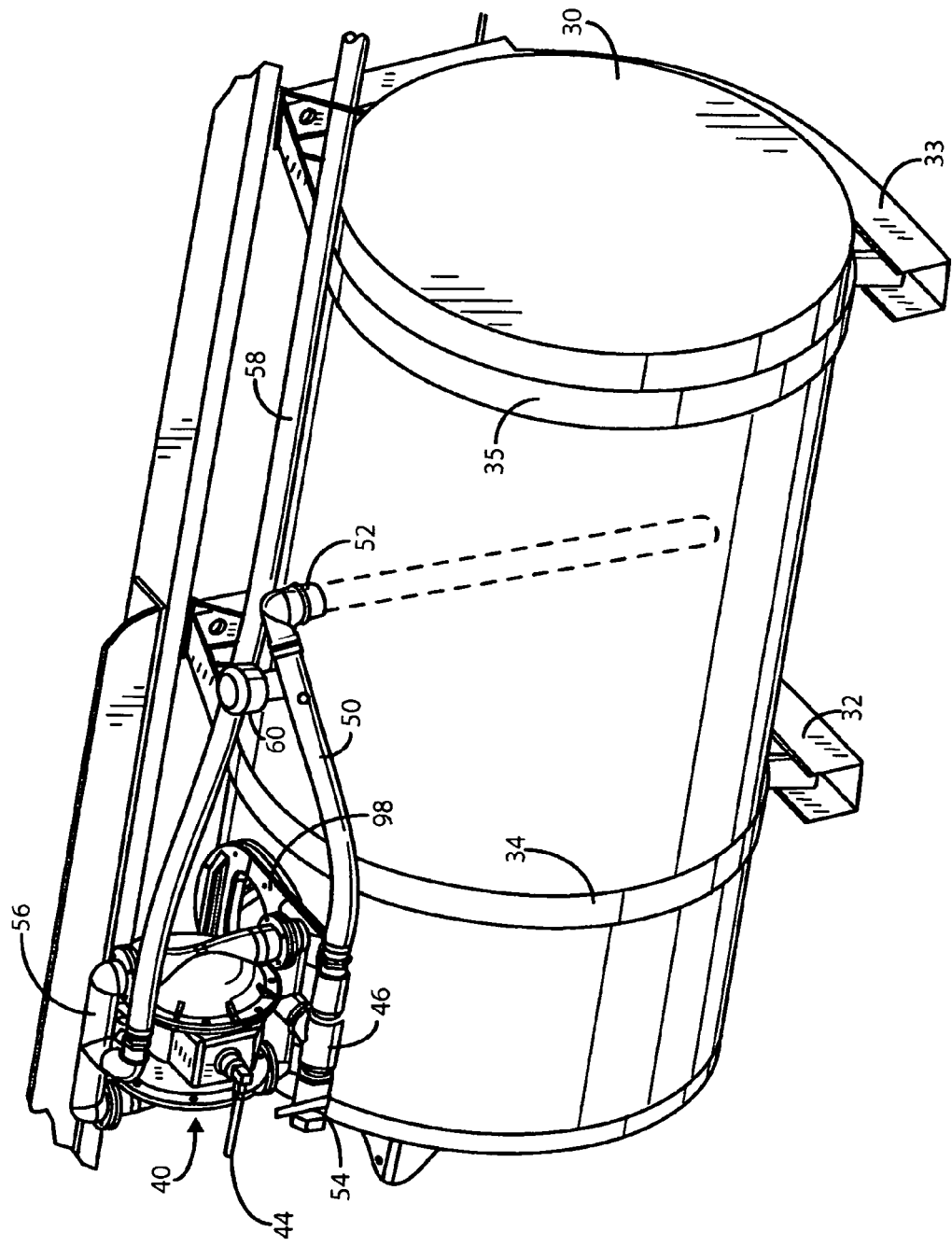
FIG. 4 is an enlarged perspective view of another embodiment of the present invention using a tank-mounted pump.

Another embodiment is depicted in FIG. 4 in which the air-operated diaphragm pump is mounted on the fluid supply tank itself. The pump is fixed to a mounting plate 90 which is mounted to the upper surface of the tank 30. This embodiment also includes a water feed line 50 which accesses the tank 30 from the top at 52 and which also preferably uses a bottom draw standpipe system.

Figure 5:
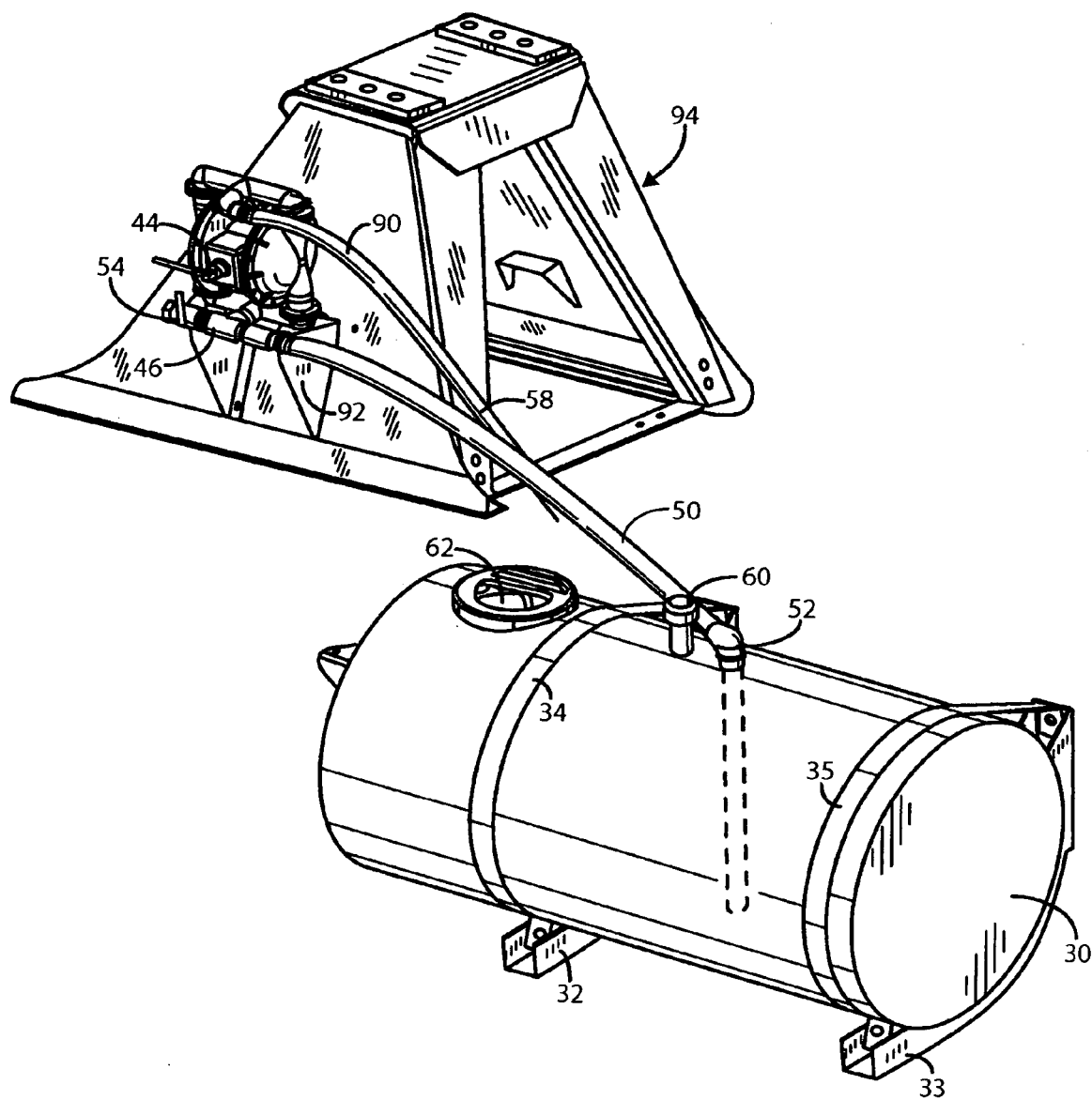
FIG. 5 is a perspective view of another embodiment which utilizes a side pump mounting.

FIG. 5 depicts yet another embodiment of an auxiliary fluid supply system in accordance with the invention in which the air-operated diaphragm pump 40 is mounted to the side of the fluid supply or water tank 30. The pump is mounted on a bracket having a platform 90 and side members 92. The bracket is attached to a stable mounting stand structure 94 which, in turn, is mounted on a truck alongside tank 30 in any convenient location in a well known manner. Connections between the tank and pump and the pump include top mounted water feed line 50 and discharge hose 58. A drain valve 54 is also shown.

Figure 6:
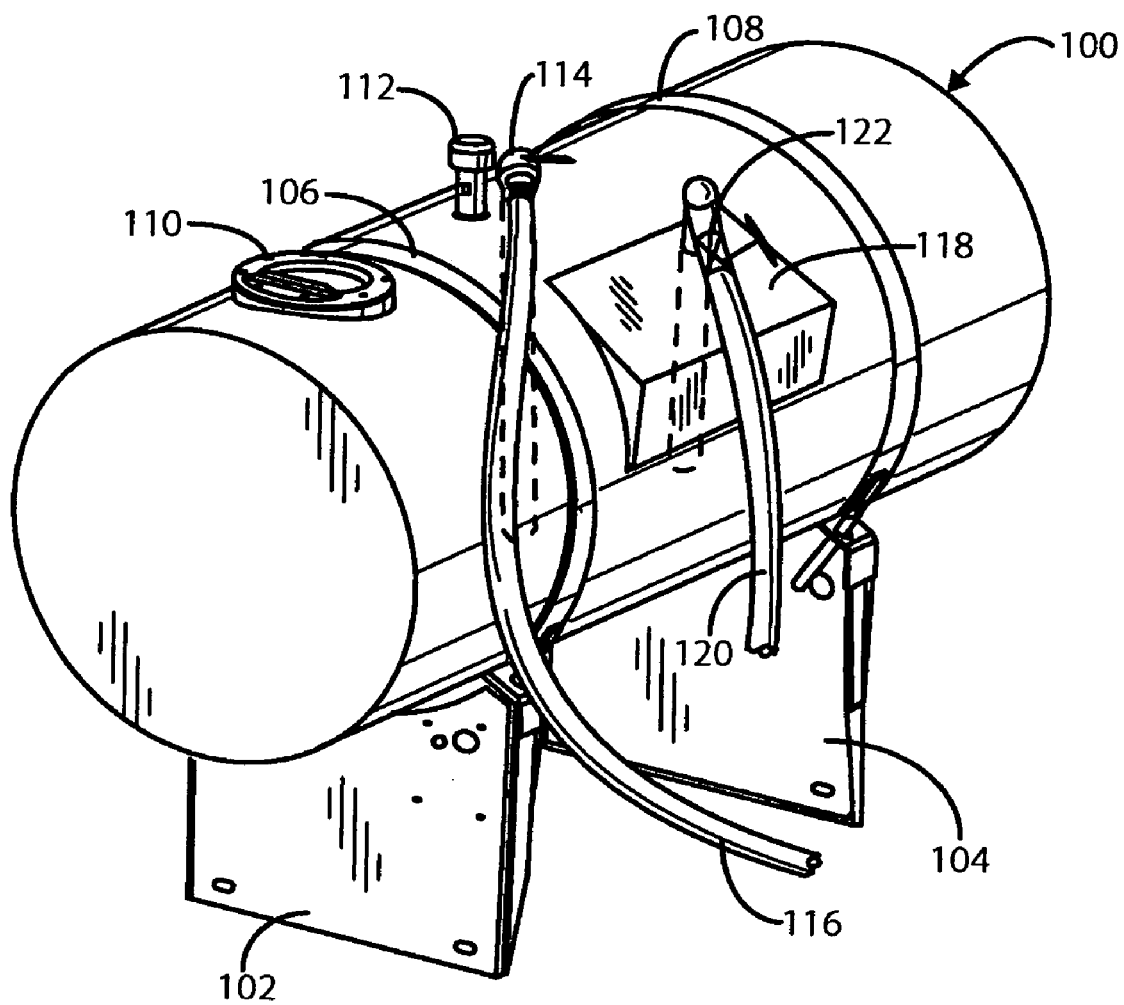
FIG. 6 is an alternate embodiment of a water supply tank equipped with an additive supply tank.

FIG. 6 depicts an alternative embodiment of a water supply tank at 100 which is carried by a pair of spaced pedestals 102 and 104 and heavy attaching straps 106 and 108. A fill opening is shown at 110 and a breather vent at 112. A top discharge, bottom draw connection is shown at 114 with outlet hose 116. The tank 100 further carries a smaller reservoir 118 containing additive material to be blended into the water supplied from the main auxiliary water supply tank 100 using supply hose 120 suitably valved at 122, which can be manifolded with supply hose 116 at the pump input or other conventional mixer system in a well known manner.

In operation, with a supply of water or other desirable fluid in the tank 30, the conventional output control valves (not shown) are opened in accordance with the use of the system and the diaphragm pump 40 is supplied with high pressure air, generally about 100 psig. The diaphragm pump 40 is operated to provide intake suction and pressurized fluid in the discharge line. When the desired amount of water is supplied for the desired use, the control valves in the pump discharge hose 58 and the drain/input valve 54 is opened. This allows water in the line to drain from the pump and also allows the pump to pump air through the system thereby purging out all the lines. This is particularly advantageous to avoid freezing of the system in cold weather.

This invention has been described herein in considerable detail in order to comply with the patent statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

What is claimed is:

1. A transit, concrete mixing vehicle for receiving concrete ingredients, mixing and dispensing concrete comprising:
    (a) an inclined revolving concrete mixing drum carried on a vehicle chassis;
    (b) a self-purging auxiliary fluid supply system for supplying unused washout or makeup water optionally including other additives, under pressure, to said concrete mixing drum, said system comprising:
        (1) a truck-mounted fluid storage tank for containing and supplying said washout or makeup water from said tank to said drum; and
        (2) an air-operated pump apparatus having a first intake assembly connected to receive fluid from said storage tank and supply said fluid under pressure to a discharge assembly as needed associated with the operation of said concrete mixing drum, said air-operated pump further being configured with a second intake to selectively supply air to an integral purge system for displacing residual fluid in said fluid supply system after use to thereby purge said system wherein said second intake is also operable as a drain.

2. A fluid supply system as in claim 1 wherein said storage tank is a bottom-feeding tank and said pump is mounted apart from said tank.

3. A fluid supply system as in claim 1 wherein said intake assembly is connected to a plurality of fluid sources.

4. A fluid supply system as in claim 1 wherein said pumping apparatus is a diaphragm pump and wherein said system further comprises a source of high pressure to operate said pump.

5. A fluid supply system as in claim 1 wherein said storage tank is a top-discharging, bottom-draw tank and said pump is mounted on said tank.

6. A fluid supply system as in claim 1 wherein said storage tank is a top-discharging, bottom-draw tank and said pump is mounted apart from said tank.

\* \* \* \* \*

UNITED STATES PATENT AND TRADEMARK OFFICE
CERTIFICATE OF CORRECTION

| | | |
|---|---|---|
| PATENT NO. | : 7,824,096 B2 | Page 1 of 1 |
| APPLICATION NO. | : 11/355049 | |
| DATED | : November 2, 2010 | |
| INVENTOR(S) | : Lindblom et al. | |

It is certified that error appears in the above-identified patent and that said Letters Patent is hereby corrected as shown below:

Column 4, line 55, should read pressure --air-- to operate.

Signed and Sealed this
Eighth Day of March, 2011

David J. Kappos
*Director of the United States Patent and Trademark Office*